United States Patent [19]

Härtel et al.

[11] 4,302,407
[45] Nov. 24, 1981

[54] HEATING OF COMBUSTIBLE MIXTURE GENERATORS FOR INTERNAL COMBUSTION ENGINES

[75] Inventors: Güunter Härtel, Neuss; Armin Schürfeld, Meerbusch, both of Fed. Rep. of Germany

[73] Assignee: Bosch & Pierburg System oHG, Neuss, Fed. Rep. of Germany

[21] Appl. No.: 210,293

[22] Filed: Nov. 25, 1980

[30] Foreign Application Priority Data

Dec. 6, 1979 [DE] Fed. Rep. of Germany ....... 2949041

[51] Int. Cl.³ .............................................. F02M 31/12
[52] U.S. Cl. .................................... 261/130; 123/549; 123/552; 123/545; 219/207; 261/131; 261/142; 261/144
[58] Field of Search ....................... 123/549, 552, 545; 261/142, 144, 130, 131; 219/206, 207

[56] References Cited

U.S. PATENT DOCUMENTS

| | | | |
|---|---|---|---|
| 1,233,763 | 7/1917 | Donning et al. ...................... | 123/552 |
| 1,278,880 | 9/1918 | De Orlow ............................ | 123/549 |
| 1,325,998 | 12/1919 | Schmid et al. ....................... | 123/552 |
| 1,461,470 | 7/1923 | Ackley ................................ | 261/142 |
| 1,630,048 | 5/1927 | Balachowsky et al. ............. | 123/549 |
| 1,791,949 | 2/1931 | Boulade .............................. | 261/142 |
| 2,014,396 | 9/1935 | Rosier ................................. | 123/552 |
| 3,789,817 | 2/1974 | Morel et al. ......................... | 123/552 |
| 3,892,215 | 7/1975 | Hickling et al. ..................... | 123/549 |
| 3,987,772 | 10/1976 | McBride, Jr. ....................... | 219/206 |
| 4,194,476 | 3/1980 | Lombardi et al. ................... | 123/552 |

*Primary Examiner*—Tim R. Miles
*Attorney, Agent, or Firm*—Toren, McGeady & Stanger

[57] ABSTRACT

A carburettor or other mixture generator 1 for an internal combustion engine has a mixing chamber 3 which is surrounded by a tubular wall 2 and delimited at its ends by a throttle valve 4 and a choke 5. The wall 2 is double-skinned with a water heating chamber 10 between the skins. In order to heat the wall 2 and prevent the condensation of liquid fuel upon it, water from a cooling water circuit of the engine to which the carburettor is fitted is circulated through the chamber 10 under the control of a thermally operated valve 21. Since the cooling water will no heat the carburettor until the engine itself has become heated, the carburettor is also provided with electrical heating for cold starting purposes. The chamber 10 is raised so that when the engine cooling water pump is not operating the chamber 10 is empty and the inside skin 9 of the wall 2 is made of electric resistance heating material. The supply of electric power to heat the skin 9 is switched on by closing the ignition switch of the engine and it is subsequently automatically switched off by a temperature-sensitive switch 15 when the cooling water of the engine reaches a sufficiently high temperature to take over the heating of the carburettor.

12 Claims, 1 Drawing Figure

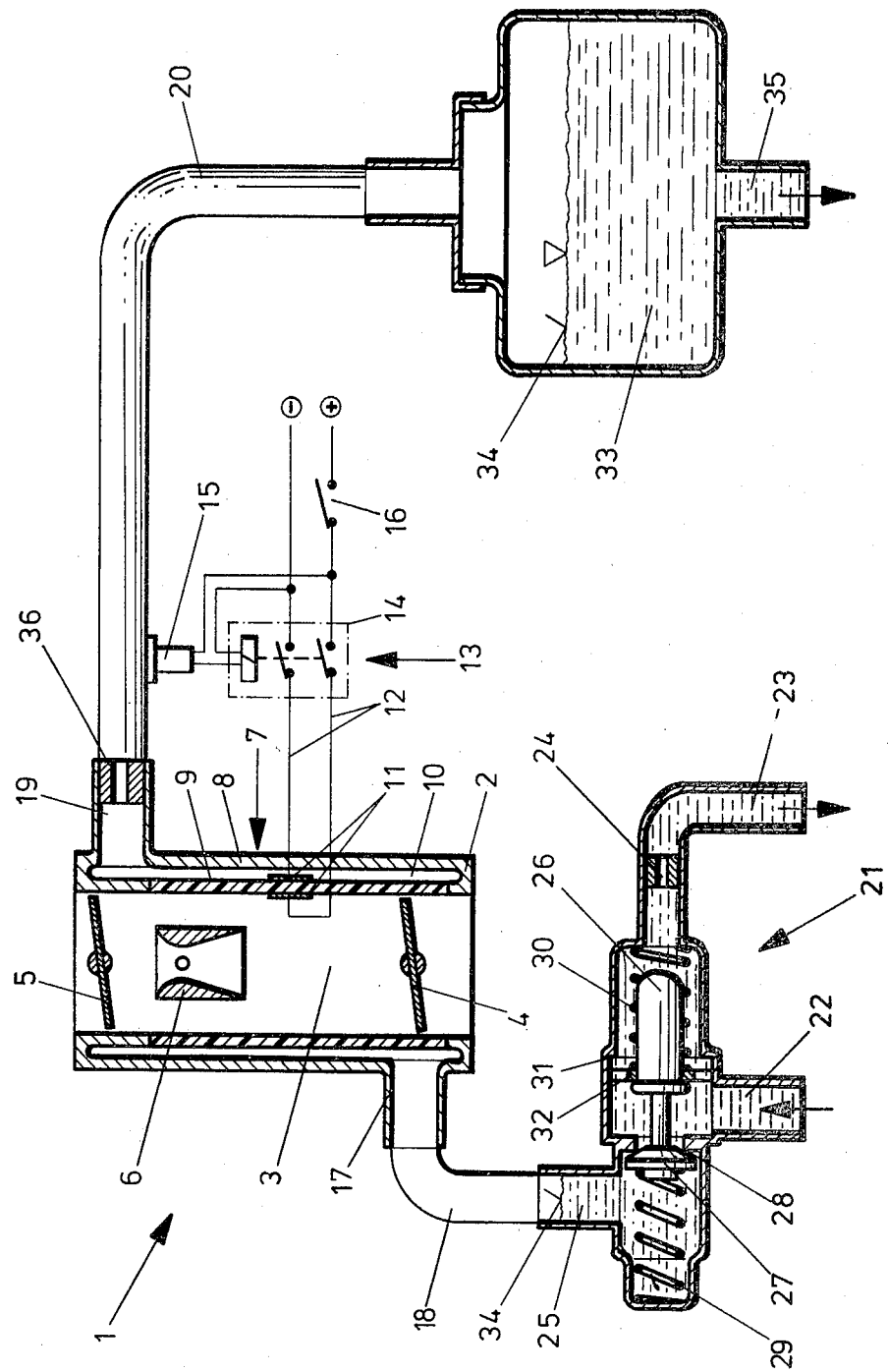

HEATING OF COMBUSTIBLE MIXTURE GENERATORS FOR INTERNAL COMBUSTION ENGINES

The invention relates to systems for heating the mixture in combustible mixture generators such as carburettors, for internal combustion engines. The invention is concerned with such generators which include a tubular wall defining a main mixture flow path, a main throttle element disposed downstream of the wall and a fuel metering device for metering fuel into the flow path near the upstream end of the path within the tubular wall, the wall being formed over part of its length as a heat exchanger having an annular heating water chamber which is provided with a water inlet at or near one end and a water outlet at or near the other end.

A combustible mixture generator such as this is disclosed for example in German Auslegeschrift No. 22 62 770. In this generator, which is a carburettor, the heat exchanger is disposed downstream of a mixing chamber of the carburettor which is of the fixed jet type, i.e. downstream of a main throttle element which is a butterfly valve. Water, which successively passes through a heat exchanger disposed in the exhaust gas stream of an engine to which the carburettor is fitted so that it is heated then passes through the heat exchanger of the carburettor to heat the fuel-air mixture, is used as a heat exchange medium. The disadvantage of this heating system is that it becomes effective only after a time has elapsed after starting of the engine, when a sufficient quantity of hot engine exhaust gas is available and the circulating heat exchange medium as well as the pipe walls surrounding the medium have been sufficiently heated. Since there is no initial heating of the tubular wall of the carburettor, it is not possible to keep the mixture flow path free of liquid fuel. This results in a certain fuel storage action of the tubular wall and a relatively large transitional enrichment is necessary when the throttle is open. In particular, a relatively rich induction mixture must be maintained and this leads to high emission of harmful CO and HC substances from the engine.

To achieve improved mixture heating, German Offenlegungsschrift No. 21 28 811 proposes the entry of hot air into the main flow path of the fuel-air mixture downstream of the main throttle element, that is the butterfly valve, of a fixed jet carburettor. However, this does not take place in the initial operating phase of the engine when an adequately enriched mixture must be available, but only after the engine has been sufficiently heated. Air entering the system is heated in a heating chamber by means of a heating element, for example a semiconductor element with a positive temperature resistance characteristic (PTC element) and the air is then introduced directly or under valve control into the main flow path of the carburettor. Excessive enrichment, made necessary because of the precipitation of liquid fuel on the cold tubular wall, may also give rise to substantial emission of harmful substances during the initial cold engine operation, even with this carburettor system.

It is the object of the present invention to provide a combustible mixture generator as initially described with a heating system which avoids the above-described disadvantages so that evaporation of the fuel by heating thereof can be achieved immediately after the ignition system of the engine has been switched on as well as during the subsequent operation of the engine.

To this end, according to this invention, we provide a combustible mixture generator as initially described, wherein the heat exchanger has water ducts for connection to a cooling water circuit of an engine, the ducts having a thermally controlled valve which is adapted to open at elevated temperatures, the heat exchanger, when the mixture generator is fitted to an engine, being situated higher than the circuit so that the cooling water level, when the valve is closed and the cooling water circuit of the engine is shut down, is below the heat exchanger, and wherein an internal wall of the heat exchanger adjoining the main mixture flow path comprises electric resistance heating material and has electrical leads for connection to an electrical supply, the leads being connected through an electric control device which is thermally controlled in dependence upon the temperature of the cooling water so that the electric resistance heating material is heated electrically when the cooling water temperature is below a predetermined value and the material is disconnected from the supply when the cooling water temperature is above the said value.

The combined water and electrical heating system permits optimum mixture heating over the entire operating range of the engine, in particular during the operating state immediately after starting the engine when cold. Since the heat exchanger is disposed above the cooling water level when the cooling water circuit is shut down, its water chamber is then filled with air, and this forms good thermal insulation for the electrically heated internal wall of the heat exchanger. This reduces electrical heat dissipation to the casing of the generator or to the cooling water. For this reason, the electric heating results in rapid evaporation of the fuel, so that from the start of operation the tubular wall of the main flow path can be kept substantially free of liquid fuel. Only slight transistional enrichment for the acceleration of the engine is necessary owing to the only very slight amount of fuel storage on the tubular wall. The induction mixture can rapidly be made lean immediately after cold starting and this leads to a reduction of the CO and HC emissions of the engine. Electric heating is replaced by heating by the heated engine cooling water after the engine has become sufficiently hot. After shutting down of the engine and while it is still warm, and with the cooling water circuit shut down, the cooling water again takes up a level beneath the heat exchanger so that the temporary thermal insulating action of the heat exchanger required for cold starting is again provided. Hitherto it was not possible to perform such rapid heating of the tubular wall since exhaust gas heating of the wall, for example in the case of engines with a cross-flow cylinder head, can be obtained only with difficulty and since cooling water heat is available only when the engine operating temperature is reached. Electrical resistance heating, by means of a PTC element or the like, is only practicable for short periods owing to the power consumption and provided that there are not any substantial heat losses.

Advantageously, the internal wall of the heat exchanger comprises at least one annular PTC element. It is also advantageous that both the internal and external surfaces of the internal wall are provided with an annular electrode coating which has good electrical and thermal conductivity and a large surface area. As already mentioned, in view of the electrical energy requirements, electrical PTC heating can be used practically only if a relatively short period of power consumption without substantial heat losses is required. This condition is satisfied by the arrangement in accordance with the invention because initially i.e. when the cooling water level is lowered, the air filled space of the heat exchanger functions as a thermally insulating screening medium. A simple heating element of large surface area functioning uniformly as well as substantially only inwardly of the tubular wall is obtained by the above-described construction of the internal wall in the form of a hollow cylinder of PTC material, such as barium titanate, which is coated on both sides with electrode material. Because of the external thermal shielding and the good thermal conduction of the electrode coating such a heating element can heat the main flow path practically from the time the engine ignition circuit is switched on so that the fuel evaporation process permits the normally rich mixture of this operating phase to be correspondingly weakened.

In a practical embodiment, the electric control device comprises a relay having contacts which control the electrical supply to the electric resistance heating material and a temperature sensitive switch is connected in service with a solenoid of the relay and is adapted to open when the temperature reaches the said value to open the contacts. The switch advantageously has a temperature sensitive element in the heating water circuit through the heat exchanger. The element is preferably in the water exit side of the heat exchanger. This coupling to the water heating circuit ensures that the electric heating is switched off only when the thermally controlled valve has opened after adequate heating of the cooling water. Heating gaps occurring during intermediate operating stages of the engine are thus reliably avoided.

Advantageously, the thermally controlled valve has an engine cooling water inlet adapted for connection to the delivery side of a cooling water pump, a cooling water outlet which has a restrictor and is adapted for connection to the suction side of the cooling water pump, and a thermally controlled heating water outlet which is connected to the inlet of the heat exchanger. Accordingly, at least part of the cooling water flows constantly through the valve so as to open the valve and supply the heat exchanger with water when the cooling water is adequately heated, and more or less cooling water can be supplied in dependence on the cross-sectional dimensions of the restrictor and of the heating water circuit of the heat exchanger.

Preferably the thermally controlled valve comprises an expanding element, which in operation is flushed by the engine cooling water, and a valve closure member which co-operates with a valve seat and is biased by a first compression spring in a valve closing direction and is opened against the action of the spring by the expanding element. Advantageous conditions are obtained especially if the expanding element is biassed in a valve opening direction by a second compression spring, which is weaker than the first compression spring, and bears against a stationary abutment when the cooling water temperature rises and the second compression spring is compressed upon opening of the closure member. It is also advantageous if the second compression spring acts upon the expanding element through an intermediate ring which maintains a free flow cross-section for the engine cooling water from the cooling water inlet to the cooling water outlet. The expanding element, flushed by cooling water, permits sensitive detection of the cooling water temperature. As is necessary for an expanding element, the element is biased, at least by the first compression spring, in a shortening direction and simultaneously in a valve closing direction. If, as is preferred, the expanding element is clamped between two compression springs and is thus floatingly supported, this will ensure that the valve opening process takes place only after the cooling water has been heated to a predetermined degree because initially the weaker, second compression spring will be compressed without opening the valve until the expanding element bears upon the abutment and is thus able to move the valve closure member from its seat. The temperature characteristic of the valve required for the operation of the heating system is thus obtained by relatively simple means.

Advantageously, the heat exchanger is connected via its water outlet to a cooling water compensating or equalising vessel of the cooling water circuit of the engine. This conventional cooling water compensating vessel can be connected, for example, to the inlet side of the engine radiator and thus enables the cooling water conducted through the heat exchanger to be returned into the cooling water circuit.

Particularly advantageous mixture heating is obtained when the heat exchanger is disposed upstream of the main throttle element of the mixture generator and extends over substantially the whole length of the tubular wall. This results in improved mixture distribution and improved conditions for all central mixture generators. Optimum evaporation occurs at a wall temperature of approximately 140° C. especially if the fuel in the flow path within the tubular wall is conducted onto the wall, i.e. onto the internal surface of the inner wall of the heat exchanger.

An example of a mixture generator in accordance with the invention will now be described with reference to the accompanying drawing which is a highly diagrammatic sectional view of the generator.

The drawing shows a very simplified view of a carburettor 1 with a tubular wall 2 which surrounds a main mixture flow path or mixing chamber 3 which is delimited downstream by a main throttle butterfly element 4 and is delimited upstream by a choke butterfly element 5. The interior of the mixing chamber 3 contains, in this example, a preatomizer 6 through which fuel or a fuel-air mixture is introduced into the mixing chamber 3, for example in dependence on inlet manifold depression of the engine to which the carburettor is fitted.

In the region of the mixing chamber 3, the tubular wall forms a heat exchanger jacket 7 with an outer wall 8 and an inner wall 9 between which there is an annular hot water chamber 10. The annular inner wall 9 is formed of PTC material and is provided on its inside surface and on its outside surface with annular electrode coatings 11 which are of large surface area, but are indicated only at one place in the diagrammatic drawing.

The electrode coatings 11 are connected by means of electric leads 12 to a control element 13 in the form of a relay 14. The leads 12 are connected to two contacts of the relay 14. A relay solenoid, which is not shown, but is associated with the relay 14 is connected in series with a thermal switch 15 which is operated in dependence upon the temperature of cooling water of the engine to which the carburettor is fitted, the cooling water being circulated through the chamber 10 as a heating medium.

The series connection of the solenoid of the relay 14 and the thermal switch 15 is connected at one side to earth or to a negative terminal of a battery or other electrical supply and at the other side, via an engine ignition switch contact 16, to the positive terminal of the electrical supply. In the energized state of the relay 14, these terminals are connected via the relay contacts and the leads 12 to the electrode coatings 11. When the relay 14 has been energized while the internal combustion engine is cold but is set in operation, the relay can disconnect the electrical supply from the electrode coatings 11 only when the thermal switch 15 opens after the engine cooling water has reached a temperature sufficient to heat the wall 9 adequately by its passage through the chamber 10.

The heat exchanger 7 is connected to a thermostatically controlled valve 21 by means of a duct 18 and a water inlet 17 situated at the bottom end of the chamber 10. Near its top, the chamber 10 is connected, via a water outlet 19 and a water discharge duct 20 to an engine cooling water equalizing vessel 33. In the present example, the thermal switch 15 is associated with the water discharge duct 20 of the carburettor heating circuit which branches from the engine cooling water circuit. This ensures that the electrical heating of the heat exchanger 7 is interrupted only when adequately heated cooling water actually flows out of the heating chamber 10.

The valve 21 is provided with a water inlet 22 which is connected to the delivery side of a cooling water circulating pump, not shown, of the internal combustion engine. The valve 21 also has a cooling water outlet 23, which is connected to the suction side of the cooling water pump and has a restrictor 24, and a thermostatically controlled heating water outlet 25 which is connected to the water inlet duct 18 and is progressively opened to the cooling water inlet 22 of the valve 21 as the cooling water temperature rises.

The valve 21 contains an expansion element having a valve closure member 27, the distance of which from the body 26 of the expansion element 26 varies with the temperature of the cooling water which flows over the body. The valve closure member 27 is associated with a valve seat 28 and is biassed in the valve closing direction by a first compression spring 29. A second compression spring 30, which is weaker than the first compression spring 29, urges the body of the expansion element 26 constantly in the valve opening direction via an intermediate ring 32 which maintains a free flow cross-section between the cooling water inlet 22 and the cooling water outlet 23 in all operating states of the valve 21.

In the cold state, which is illustrated, the closure member 27 is urged by the first compression spring 29 against the valve seat 28 and the expansion element 26 can move to the right as the cooling water is heated while the second spring 30 is compressed until an intermediate collar 32 bears upon a stop abutment 31 of a casing of the valve. Further heating of the cooling water causes the expansion element 26, the position of which is fixed, to move the member 27 against the action of the first compression spring 29 off the valve seat 28. With the engine cooling water pump in operation, cooling water is conducted progressively through the heat exchanger 7 and the maximum amount of cooling water supplied is set by appropriate cross-sectional dimensioning of a restrictor 36 in the water outlet 19. When the thermal switch 15 detects an adequate water temperature in the carburettor heating circuit, the electric heating is switched off because sufficient heat will now be supplied by the engine cooling water to the heat exchanger 7. The engine cooling water which flows through the carburettor heating circuit finally passes into the cooling water equalizing vessel 33 from where it can be returned via an outlet 35 thereof into the normal engine cooling water circuit.

When the internal combustion engine is shut down and is still warm, the valve 21 will initially be opened. Settling down of the engine cooling water circuit or of the cooling water pump causes the heating circuit of the heat exchanger 7 to be emptied and for the same cooling water level 34 to be established in the cooling water equalizing vessel 33 and in the water inlet duct 18. This level equalization is maintained when the valve 21 gradually closes as the engine cools. If on the other hand the internal combustion engine is again shut down while it is still cold, the valve 21 will not have opened so that similar cooling water level conditions are again obtained. This means that in the cold state of the engine, the heat exchanger 7 is able to produce its thermal insulating action by means of the air filled hot water chamber 10 in every case. Changeover to its heat exchanger function takes place only when adequately hot engine cooling water flows through the heating circuit.

The carburettor or other mixture generator in accordance with the invention is suitable for all mixture generators for internal combustion engines, for example, fixed jet carburettors, variable jet carburettors and central fuel injection systems. Under cold start conditions, the heating system is prepared for very rapid, effective PTC heating with low heat losses, since the heat exchanger chamber 10 is insulatingly filled with air and the thermal switch 15 is closed because of the low temperature. Accordingly, effective evaporation of the fuel on the wall of the mixture chamber 3 can therefore take place immediately after the engine ignition procedure. This permits weakening of the mixture, i.e. reduced fuel consumption and reduced emission of harmful substances, immediately after the engine ignition procedure. At that moment, since there is not sufficient cooling water heat available at cold starting, heat return is interrupted by emptying of the heat exchanger so that PTC heating, which is effective for optimum mixture conditioning, can be performed. The transition to engine cooling water heating and switching back to electric heating takes place fully automatically

We claim:

1. In a combustible mixture generator for an internal combustion engine, said generator including a tubular wall defining a main mixture flow path, a main throttle element mounted downstream of said wall, fuel metering means for metering fuel into said flow path near the upstream end thereof within said tubular wall, and heat exchanger means incorporated in said wall over at least a part of the length thereof, said heat exchanger means including means defining an annular heating water chamber, water inlet means adjacent one end of said chamber and water outlet means adjacent the other end of said chamber, the improvement comprising water ducting connected to said inlet and said outlet for connection to a cooling water circuit of said engine, said ducting containing thermally controlled valve means which is adapted to open at elevated temperatures, said heat exchanger means being situated higher than said cooling water circuit whereby the level of said cooling water when said valve means is closed and said cooling water circuit of said engine is shut down is below said heat exchanger means, and said heat exchanger means including an internal wall bounding said main mixture flow path, said internal wall comprising electric resistance heating material, and said heat exchanger means further comprising electrical leads connected to said electric resistance heating material and adapted for connection to an electrical supply, and a thermally controlled electric control device in said leads, said electric control device being controlled in dependence upon the temperature of said cooling water, whereby said electric resistance heating material is heated electrically when said cooling water temperature is below a predetermined value and said material is disconnected from said supply when said cooling water temperature is above said value.

2. A combustible mixture generator as claimed in claim 1, in which said internal wall of said heat exchanger means comprises at least one annular PTC element.

3. A combustible mixture generator as claimed in claim 2, further comprising annular electrode coatings of large surface area and of good electrical and thermal conductivity on internal and external surfaces of said at least one PTC element, said leads being connected to said electrode coatings.

4. A combustible mixture generator as claimed in claim 1, in which said electrical control device comprises a relay, said relay including a solenoid and contacts which control the electrical supply to said electric resistance heating material and said device further comprising a temperature sensitive switch connected in series with said relay, said switch being adapted to open when said cooling water temperature reaches the said predetermined value and opening of said switch opens said contacts.

5. A combustible mixture generator as claimed in claim 4, in which said switch includes a temperature sensitive element in said ducting.

6. A combustible mixture generator as claimed in claim 5, in which said temperature sensitive element is in that part of said ducting which is connected to said outlet of said heat exchanger means.

7. A combustible mixture generator as claimed in claim 1, in which said thermally controlled valve means includes an engine cooling water inlet adapted for connection to the delivery side of a cooling water pump in said cooling water circuit, a cooling water outlet, a restrictor in said outlet, said outlet being adapted for connection to the inlet side of said cooling water pump, and a thermally controlled heating water outlet which is connected by said ducting to said inlet of said heat exchanger means.

8. A combustible mixture generator as claimed in claim 7, in whch said thermally controlled valve means comprises an expanding element, means for conducting said engine cooling water over the surface of said element, a valve seat, a valve closure member co-operating with said seat and first compression spring means biassing said valve closure member on to said seat, said valve closure member being movable away from said seat against the action of said first compression spring means by expansion of said expanding element.

9. A combustible mixture generator as claimed in claim 8, further comprising stationary abutment means and second compression spring means biassing said expanding element in a direction to move said valve closure member away from said seat, said second compression spring means being weaker than said first compression spring means and said expanding element bearing against said stationary abutment when said cooling water temperature rises and said second compression spring means is compressed upon movement of said closure member away from said seat.

10. A combustible mixture generator as claimed in claim 9, further comprising an intermediate ring which maintains a free flow cross-section in said valve for the flow of said engine cooling water from said cooling water inlet to said cooling water outlet and wherein said second compression spring means acts upon said expanding element through said intermediate ring.

11. A combustible mixture generator as claimed in claim 1, further comprising a cooling water equalizing vessel in said cooling water circuit, said ducting connecting said outlet of said heat exchanger means to said cooling water equalizing vessel.

12. A combustible mixture generator as claimed in claim 1, in which said heat exchanger means is disposed upstream in said tubular wall of said main throttle element and extends over substantially the whole length of said tubular wall.

* * * * *